United States Patent
Hebbar (10) Patent No.: US 12,282,934 B1
(45) Date of Patent: *Apr. 22, 2025

(54) ANALYSIS OF DEBIT CARD COMPARED TO CREDIT CARD USE

(71) Applicant: Wells Fargo Bank, N.A., San Francisco, CA (US)

(72) Inventor: Venkatesh Hebbar, Chester Springs, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,369

(22) Filed: Feb. 16, 2023

Related U.S. Application Data (63) Continuation of application No. 17/644,952, filed on Dec. 17, 2021, now Pat. No. 11,610,217.

(51) Int. Cl.
| | | |
|---|---|---|
| *G06Q 30/00* | (2023.01) | |
| *G06Q 30/0207* | (2023.01) | |
| *G06Q 30/0251* | (2023.01) | |

(52) U.S. Cl.
CPC ..... *G06Q 30/0215* (2013.01); *G06Q 30/0254* (2013.01)

(58) Field of Classification Search
CPC .............. G06Q 30/0215; G06Q 30/0254
See application file for complete search history.

(56) References Cited

U.S. PATENT DOCUMENTS

| | | | |
|---|---|---|---|
| 7,680,739 B1 | 3/2010 | Venturo et al. | |
| 8,408,455 B1 * | 4/2013 | Taylor | G06Q 20/1085 |
| | | | 235/379 |
| 8,412,593 B1 * | 4/2013 | Song | G06Q 30/00 |
| | | | 705/35 |
| 10,504,385 B1 | 12/2019 | Harris et al. | |
| 10,832,319 B1 * | 11/2020 | Lister | G06Q 40/03 |
| 11,315,179 B1 | 4/2022 | Rehder et al. | |
| 2006/0195376 A1 | 8/2006 | Jung et al. | |
| 2007/0156530 A1 | 7/2007 | Schmitt et al. | |
| 2008/0059317 A1 * | 3/2008 | Chandran | G06Q 20/20 |
| | | | 705/16 |
| 2008/0065569 A1 | 3/2008 | Dutt et al. | |
| 2008/0243661 A1 | 10/2008 | Bussone et al. | |
| 2009/0043663 A1 | 2/2009 | Prater | |
| 2010/0211445 A1 * | 8/2010 | Bodington | G06Q 40/02 |
| | | | 705/14.28 |

(Continued)

OTHER PUBLICATIONS

Pros and cons of debit versus credit cards. (May 25, 2020). The Daily Telegraph (Year: 2020).*

(Continued)

*Primary Examiner* — Matthew L Hamilton
(74) *Attorney, Agent, or Firm* — Merchant & Gould P.C.

(57) ABSTRACT

An example computing device includes: a processor; and a system memory, the system memory including instructions which, when executed by the processor, cause the computing device to: identify a financial account associated with debit card use; parse financial transactions associated with the financial account to identify debit card transactions; categorize the debit card transactions into categories based upon types of merchants; map the categories to incentives associated with a credit card; and present potential savings associated with the incentives.

20 Claims, 6 Drawing Sheets

(56) References Cited

U.S. PATENT DOCUMENTS

| | | | |
|---|---|---|---|
| 2012/0233074 A1* | 9/2012 | Dangott | G06Q 40/06 705/44 |
| 2014/0122213 A1* | 5/2014 | Wong | G06Q 30/0233 705/14.33 |
| 2014/0156501 A1 | 6/2014 | Howe | |
| 2015/0324830 A1* | 11/2015 | Chandrasekaran | G06Q 30/0226 705/14.27 |
| 2015/0332305 A1* | 11/2015 | Kodali | G06Q 30/0224 705/14.25 |
| 2016/0225011 A1* | 8/2016 | Shah | G06Q 20/387 |
| 2016/0350792 A1 | 12/2016 | Rajappa et al. | |
| 2016/0358259 A1* | 12/2016 | Cucchiara | G06Q 40/06 |
| 2018/0285899 A1* | 10/2018 | Yayli | G06Q 30/0207 |
| 2020/0051108 A1* | 2/2020 | Krajicek | G06Q 30/0215 |
| 2021/0027357 A1 | 1/2021 | Bonfigli et al. | |
| 2021/0158439 A1* | 5/2021 | Budde | G06Q 30/0213 |
| 2023/0005043 A1* | 1/2023 | Chandran | G06Q 30/0643 |

OTHER PUBLICATIONS

Iliza, A. (Aug. 25, 2020). Debit card or credit card, what's better? The New Times (Year: 2020).*

Harkness, Brendan, "A Guide To Credit Card Benefits, " Credit Card Insider, 2021 Credit Card Insider, Updated Dec. 7, 2020, 23 pages.

Credit and Debit Cards: What You Need to Know, New York Times, 2009.

CreditCards.com Provides Credit Card Search Engine to ShopLocal Business Wire, Sep. 25, 2007.

* cited by examiner

ANALYSIS OF DEBIT CARD COMPARED TO CREDIT CARD USE

BACKGROUND

Both debit cards and credit cards can be used to purchase goods and services without requiring the exchange of a physical check or cash. However, debit cards can function much differently from credit cards. For example, debit cards draw on funds deposited in a bank account, while credit cards borrow money that is later paid back to the card issuer. Further, the benefits associated with the use of debit cards and credit cards can vary widely.

SUMMARY

Embodiments of the disclosure are directed to an analysis of debit card use compared to credit card use.

In an aspect, an example computing device includes: a processor; and a system memory, the system memory including instructions which, when executed by the processor, cause the computing device to: identify a financial account associated with debit card use; parse financial transactions associated with the financial account to identify debit card transactions; categorize the debit card transactions into categories based upon types of merchants; map the categories to incentives associated with a credit card; and present potential savings associated with the incentives.

The details of one or more techniques are set forth in the accompanying drawings and the description below. Other features, objects, and advantages of these techniques will be apparent from the description, drawings, and claims.

DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

Examples described herein are directed to an analysis of debit card use as compared to credit card use.

Users may use debit cards for financial transactions when the use of credit cards may be more beneficial/advantageous. For example, credit cards can have certain incentives, such as: cashback, points, or miles, building a positive credit history, providing protection if the card is lost or stolen, providing extended warranties on certain products or services, providing more flexibility (e.g., booking a hotel or renting a car), and the like. Users may continue to use debit cards that are disadvantageous because of certain factors, such as: fear of falling into bad credit habits such as overspending, fear of exceeding credit limits, not being aware of or understanding the benefits/advantages of credit transactions, misconceptions that small transactions are easier to pay via debit, etc.

The disclosed embodiments provide an analysis of debit card use compared to credit card use. This analysis can be leveraged to provide a customized dashboard for users that illustrates that analysis, including information on how using a credit card for certain transactions and/or categories of transactions could enhance incentives for the user, such as by increasing the amount of cashback to the user.

In some examples, the disclosed techniques include an application running on a computing device this is programmed to provide information, training, and/or learning to guide a user on the benefits and/or tradeoffs of debit card use as compared to credit use. The application may be affiliated with the user's bank accounts and/or payment accounts such that the application may be granted access to the user's current and historical transactions, and the application may be configured to provide information on debit card use as compared to credit card use for a particular financial transaction of a user, or on an agglomerated set of financial transactions.

The application may be configured to track the user's financial transactions made with a debit card and provide feedback on the benefits of performing the transactions with a credit card as opposed to the debit card (e.g., "you could have earned $25 cashback in gas purchases") based on user history, financial behavior, and/or other user information that the user may provide and/or grant access to, such as location or preferences, or other user information such as internet search/browsing history that the user elects to provide/allow the application to collect. The application may be configured to track user transactions further based on transaction information, e.g., merchant codes, spending categories, location, etc.

The application may be configured to provide the information as a dashboard so that the user can visually see the benefits of the use of a credit card as opposed to a debit card. For example, the dashboard can be configured to show the actual fees and/or benefits of their recent debit card transactions and compare those fees and/or benefits of the potential use of a credit card for the same transactions. The application may also be configured to determine whether the user has the optimal credit card and provide preapproved credit card offers if the user does not.

Figure 1:
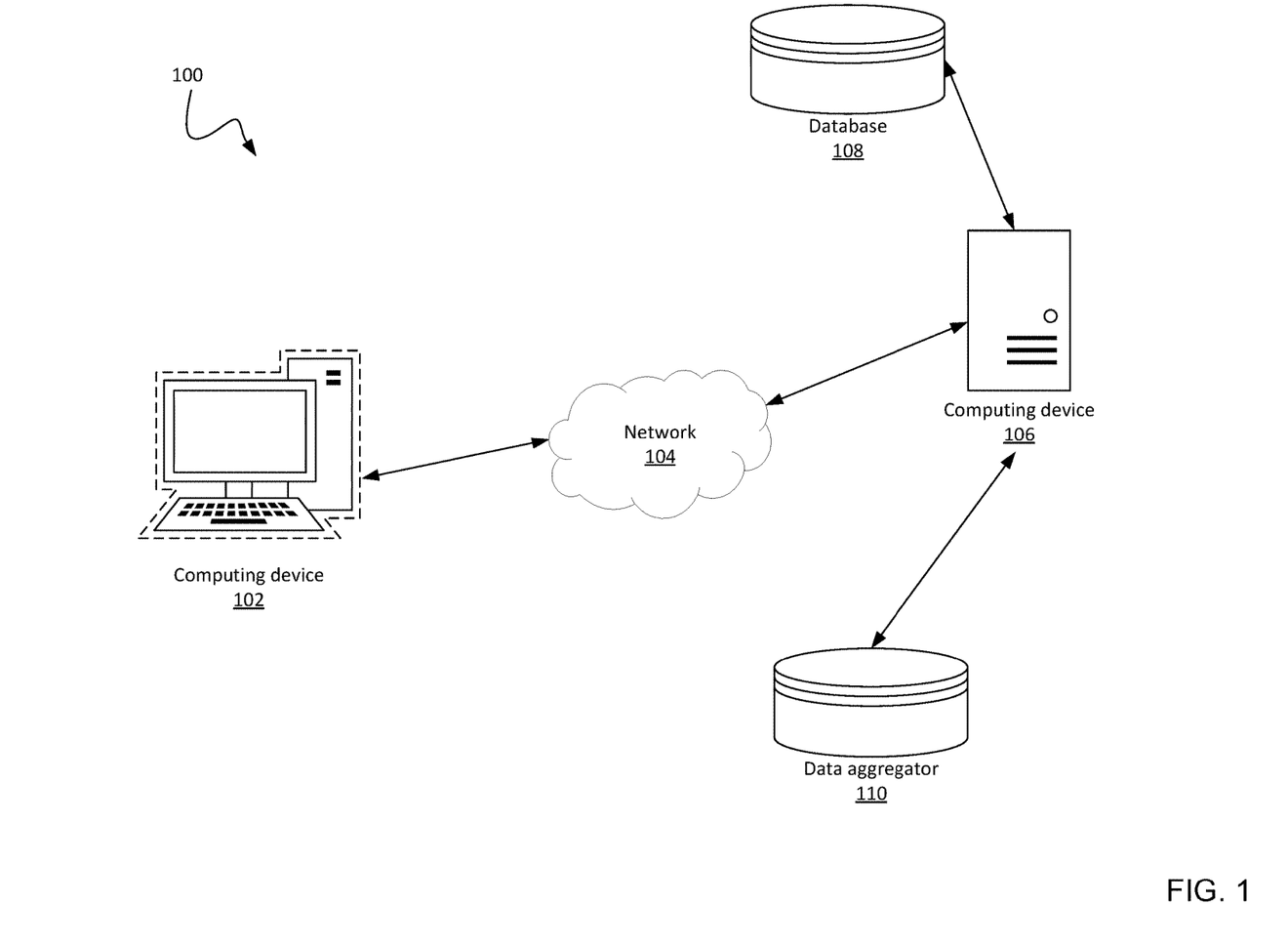
FIG. 1 shows an example system for analyzing the use of debit cards.

FIG. 1 illustrates an example system 100 that facilitates an analysis of debit card as compared to credit card use. The system 100 includes a user computing device 102, a network 104, a financial institution server computing device 106, a database 108, and a data aggregator 110.

In this example, the user computing device 102 is programmed to access financial information associated with a user. For instance, the user computing device 102 can be a desktop, laptop, tablet, smartphone (e.g., mobile wallet), or other device that is capable of communicating with the financial institution server computing device 106 to access financial information. This financial information can include, without limitation, banking information such as checking and savings accounts, credit card accounts, etc.

The example network 104 is a computer network and can be any type of wireless network, wired network, and cellular network, including the Internet. As noted, the user computing device 102 can communicate with the financial institution server computing device 106 through the network 104.

The financial institution server computing device 106 is a server computing device of a financial institution, such as a bank. The financial institution server computing device 106 is programmed to perform various financial functions, such as managing account information (e.g., checking accounts, savings accounts, credit card accounts, money market accounts, etc.), transaction information, user information, etc. The financial institution server computing device 106 facilitates financial transactions for users and third parties. For instance, the financial institution server computing device 106 is programmed to facilitate and record debit card and credit card transactions for users.

The financial institution server computing device 106 is programmed to access the database 108 to facilitate financial transactions, such as debit card and credit card transactions. The financial institution server computing device 106 is further programmed to access the database 108 to access other financial information, such as information associated with checking accounts, credit card accounts, and savings accounts, including transaction data.

As described further below, the financial institution server computing device 106 is programmed to access one or more user accounts, analyze the use of debit cards associated with those accounts, and provide a dashboard illustrating such an analysis to the user. The financial institution server computing device 106 can also be programmed to identify one or more credit card products to offer to the user to supplement or replace the debit card use. In some instances, the credit cards can be offers where the user is prequalified or otherwise preapproved.

Although the computing devices 102 and 106 are depicted as single devices, in a typical environment, the computing devices 102 and 106 can be implemented as multiple devices. For instance, thousands or millions of user computing devices 102 can connect to the financial institution server computing device 106, and the financial institution server computing device 106 can be implemented as multiple servers in server farms and/or cloud computing environments. Many configurations are possible.

Further, the transaction data can be accessed from third parties beyond the data stored in the database 108. For instance, the financial institution server computing device 106 can be programmed to access data from one or more third party banks, payment networks, and/or other financial institutions.

In some examples, the financial institution server computing device 106 accesses transaction data from financial data aggregators 110. Examples of such financial data aggregators include Intuit Mint from Intuit, Inc. and Personal Capital from Personal Capital Corporation. These financial data aggregators 110 combine financial accounts for a user and allow multiple financial accounts held at different financial institutions to be analyzed at one time. In this context, the financial institution server computing device 106 can be programmed to access the aggregated financial data from one or more of these financial data aggregators 110 to provide a wholistic view of the user's debit card and credit card use.

Figure 2:
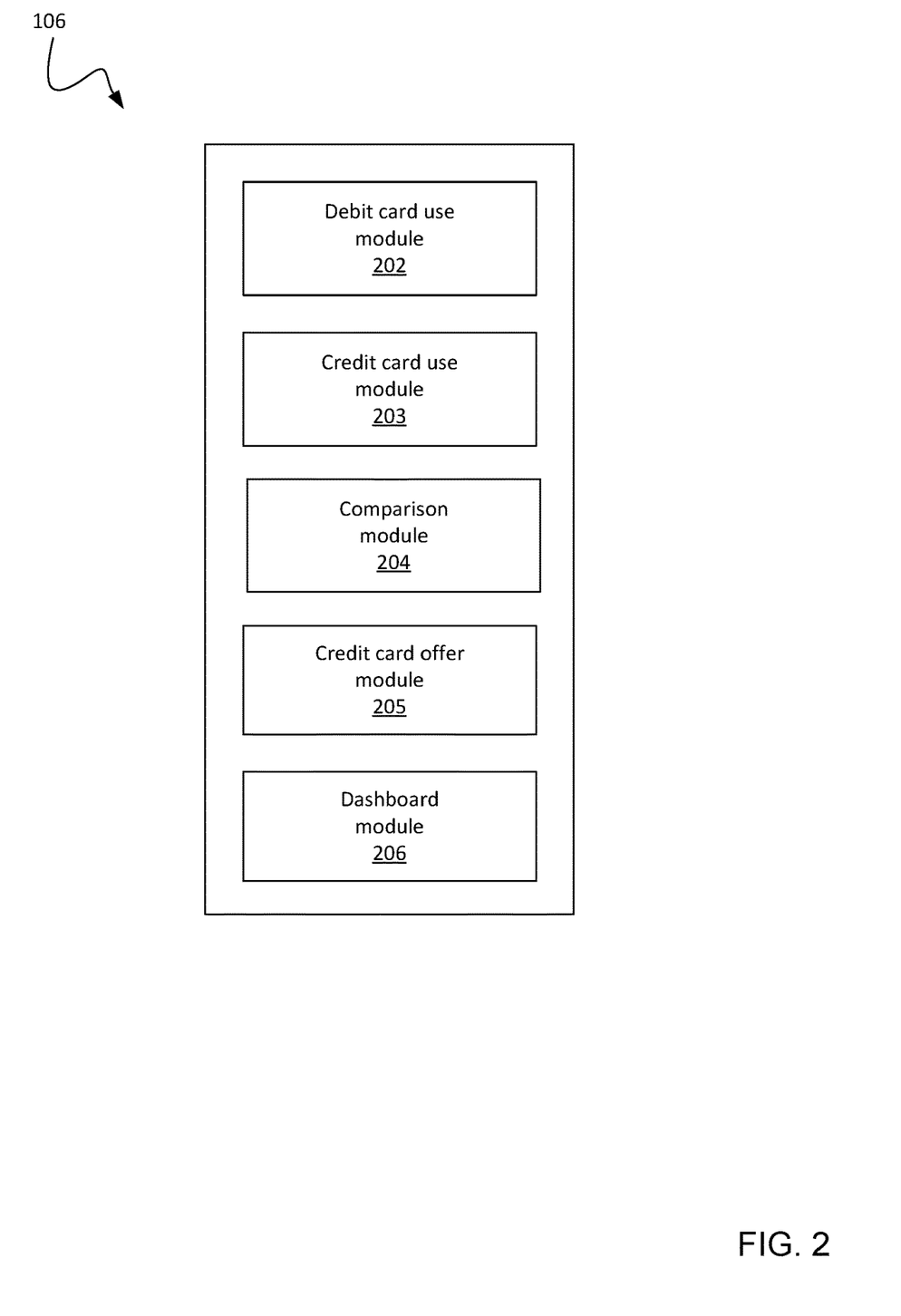
FIG. 2 shows example logical components of a computing device of the system of FIG. 1.

FIG. 2 illustrates example logical components of the financial institution server computing device 106 that are generally programmed to analyze debit card use as compared to credit card use. These components include a debit card use module 202, a credit card use module 203, a comparison module 204, a credit card offer module 205, and a dashboard module 206.

The debit card use module 202 is programmed to analyze an account to determine debit card use associated with the account. In one example, the debit card use module 202 is programmed to analyze each transaction on an account and identify those transactions that are associated with a debit card.

For instance, when the user has a checking account, the debit card use module 202 is programmed to analyze each transaction in the checking account for a specified period of time and identify certain transaction types associated with the use of debit cards. One example of a schema and example data that can be associated with each transaction in a checking account is the following.

| Date | Transaction type | Vendor | Amount | Transaction code |
|---|---|---|---|---|
| Nov. 21, 2021 | Debit card | Gas Mart | $100.00 | Automotive |
| Nov. 18, 2021 | ATM withdrawal | — | $50.00 | — |
| Nov. 15, 2021 | Debit card | Mom Grocery | $25.00 | Grocery |

Each transaction for the checking account includes a date, merchant, and amount. For instance, the example above involves a debit card transaction for $25.00 on Nov. 15, 2021 and another for $100.00 on Nov. 21, 2021. Each of these transactions also includes a transaction code (e.g., "Automotive" or "Grocery"), which can be a Merchant Category Code (MCC) code that categorizes the merchant's business, such as automotive and grocery in the example.

There are many MCC codes (approximately 5000) that can be analyzed. In some instances, the MCC codes can be grouped to determine purchase behavior to thereby optimize debit card and credit card use. For instance, MCC codes related to office equipment (e.g., MCC 5021—office furniture; MCC 5045—computers) can be grouped and analyzed relative to incentives a credit card product may provide that are associated with the office product industry. This can be accomplished due to the MCC codes being classified by market segment.

In addition to MCC codes, in alternative embodiments the debit card use module 202 can analyze other information associated with each transaction, such as the vendor name. In some instances, certain vendors or groups of vendors provide incentives or promotions for users. The debit card use module 202 can group the vendors according to the debit card use and consider those incentives, particularly with respect to how those incentives can be enhanced or captured through use of any alternative payment instrument, like a credit card.

In this example, the debit card use module 202 scans the checking account and identifies all transactions associated with the transaction type "Debit card". The debit card use module 202 can further categorize the use based upon the transaction codes (e.g., MCC codes). For instance, the debit card use module 202 can identify a total of transactions for various types of purchases based upon the transaction codes. Examples include one or more of: gas, online shopping, dining/restaurant, travel, drug store, or home improvement/furnishings, grocery, wholesale club. The debit card use module 202 ignores other transactions on the checking account, such as those from deposits, withdrawals (e.g., "ATM withdrawal"), and checks.

Although a single checking account is described, the debit card use module 202 can be programmed to analyze multiple accounts, if desired. For instance, if the user has two checking accounts, the debit card use module 202 can be programmed to analyze both accounts simultaneously. Further, transactions from multiple accounts can be accessed through the data aggregator 110.

The analysis of the account or accounts by the debit card use module 202 can be initiated multiples ways. In one instance, the account can be selected by the financial institution server computing device 106 for analysis based upon certain criteria, such as a threshold use of debit cards. For instance, if a debit card is used more than a certain number of times over a period, such as 5, 10, 15, or 20 times in one month, the account can be automatically analyzed by the debit card use module 202. In other examples, the analysis can be manually initiated by the user and/or the financial institution server computing device 106 on demand.

In a similar fashion, the credit card use module 203 is programmed to analyze an account to determine credit card use associated with the account. One example of such an account is a credit card account held by the user at the financial institution or a third party. In one example, the credit card use module 203 is programmed to analyze each transaction on the account. This credit card use information can be used to determine whether the user is optimizing the use of the credit card, along with comparison of possible other products like debit cards. For instance, if the user is using the credit card for only a few or no transactions, there may be a benefit for transitioning to use the credit card more, as described below. Further, the user can be encouraged for positive use of the card that results in optimized incentives to the user. Many configurations are possible.

The comparison module 204 is programmed to analyze the output of the debit card use module 202 and the credit card use module 203 to compare such use with one or more credit card products. In the examples provided, the comparison module 204 is programmed to map the transaction codes of debit card use to one or more incentives associated with one or more a credit card products. For instances where a new or different credit card product may be advised, the credit card offer module 205 is programmed to make such offers to the user based upon the comparison by the comparison module 204, as described further below.

For instance, many credit card products provide incentives for certain types of purchases from certain merchants. For instance, many credit cards provide percentage discounts, rewards points, travel miles, or cashback for purchases made in certain categories, such as gas, grocery, restaurant, and many of the other categories listed above.

The comparison module 204 compares the categories of debit card use to the incentives provided by a particular credit card products to estimate possible incentives for the user.

For instance, assume a credit card provides a 5 percent cashback incentive for the purchases of gas and food and a 4 percent cashback incentive for the purchase of groceries. The comparison module 204 identifies those categories of debit card purchases associated with gas, food, and groceries, and ignores other purchase types (e.g., medical, electronics), as noted below.

| Category | Debit card use | Credit card incentive | Possible savings |
| --- | --- | --- | --- |
| Gas | $500.00 | 5 percent | $25.00 |
| Grocery | $750.00 | 4 percent | $30.00 |
| Food | $1,000.00 | 5 percent | $50.00 |
| Medical | $250.00 | — | $0.00 |
| Electronics | $850.00 | — | $0.00 |

The comparison module 204 maps the incentives provided by the credit card with the categories of debit card use for the user. In this example, the debit card transactions totaling $500.00 for gas purchases are mapped to the incentive of 5 percent cashback for the credit card. The grocery and food incentives are likewise mapped. The debit card transactions for medical and electronics are not mapped because there is no associated incentive for those types of purchases provided by the relevant credit card.

In some examples, the comparison module 204, in conjunction with the credit card offer module 205, also selects among a plurality of credit card products to present the user with the credit card products that optimize the incentives for the user (e.g., provide the greatest cash back). For instance, if the user has a high amount of travel transactions, the credit card offer module 205 is programmed to select a credit card product that provides the best incentives for travel purchases.

In some instances, multiple credit card products can be available to the user from the financial institution or third party. In such a scenario, the credit card offer module 205 is programmed to analyze each product and present the best product(s) to the user based upon the user's situation.

For example, the credit card offer module 205 is programmed to analyze the output of the comparison module 204 and identify those credit cards which may be available from the financial institution for the user. The credit card offer module 205 is programmed to select the best one or more credit card products that may optimize the incentives for the user.

For instance, assume the financial institution offers three credit card products X, Y, and Z. Each has different incentives based upon such criteria as annual fees, cashback for certain purchases, etc. The credit card offer module 205 can analyze the credit card products X, Y, and Z and present the possible incentives to the user, as illustrated below.

| Category | Debit card use | Credit card X incentive | Credit card Y incentive | Credit card Z incentive |
| --- | --- | --- | --- | --- |
| Gas | $500.00 | 5 percent | 1 percent | 3 percent |
| Grocery | $750.00 | 4 percent | 1 percent | 3 percent |
| Food | $1,000.00 | 5 percent | 1 percent | 3 percent |
| Medical | $250.00 | — | — | 3 percent |
| Electronics | $850.00 | — | 7.5 percent | 3 percent |

Depending on the purchase habits of the user, the credit card offer module 205 determines the optimized credit card product(s) for the user. For instance, in the example above, credit card X would provide the greatest cashback incentive to the user. As further noted below, various options for different credit card products can be presented to the user by the dashboard module 206.

Further, the credit card offer module 205 can be programmed to identify those credit card products that the user may be prequalified to obtain. This can help streamline the process by which the user can obtain one or more of the suggested credit cards from the financial institution.

In yet other embodiments, the financial institution (or possibly a third party aggregator) may offer many credit card products, either internally or through partnerships with other financial institutions. In that instance, the credit card offer module 205 analyzes each of the available credit card products and selects a subset of the best options for the user.

In yet other examples, the comparison module 204 can also examine existing credit cards held by the user. In such an instance, the user may be underutilizing the existing credit card(s) already held by the user. The comparison module 204 can be programmed to encourage the user to use the existing credit card(s) and/or provide a mixture of new credit cards and existing credit card(s) and show the benefits thereof, similar to that above.

For example, the comparison module 204 may determine that the user already has the optimal credit card product but is underutilizing it. In this scenario, the comparison module 204 provides information encouraging the user to use the credit card rather than the debit card for certain purchases to optimize the incentives for the user.

Although the examples above discuss certain incentives associated with the use of a credit card, such as cashback percentages for purchases, there can be other incentives. For instance, other incentives can also be highlighted, such as points, building a positive credit history, providing protection if the card is lost or stolen, providing extended warranties on certain products or services, providing more flexibility (e.g., booking a hotel or renting a car), and the like. These incentives can also be estimated and presented to the user, as described further below.

In some situations, positive reinforcement can also be provided. For instance, when the comparison module 204 determines that the user is using the credit card in an optimized manner to maximize the incentives associated with such use, the comparison module 204 can be programmed to indicate such use and encourage the user. For instance, the comparison module 204 can be programmed to state the specific benefits for such as, such as: "By using your credit card for these transactions instead of the debit, you earned $10 back this month".

The dashboard module 206 is programmed to present the potential incentives to the user. In some examples, the dashboard module 206 generates a graphical user interface, such as the example interface shown in FIGS. 3-4. For instance, the dashboard module 206 can be programmed to provide the information on possible savings when the user accesses the user's account or wallet.

In other examples, the dashboard module 206 can present the information to the user in other formats, such as communications that are sent to the user through email or text message. In yet other examples, the user can request such information on an on-demand basis. Other configurations are possible.

Figure 3:
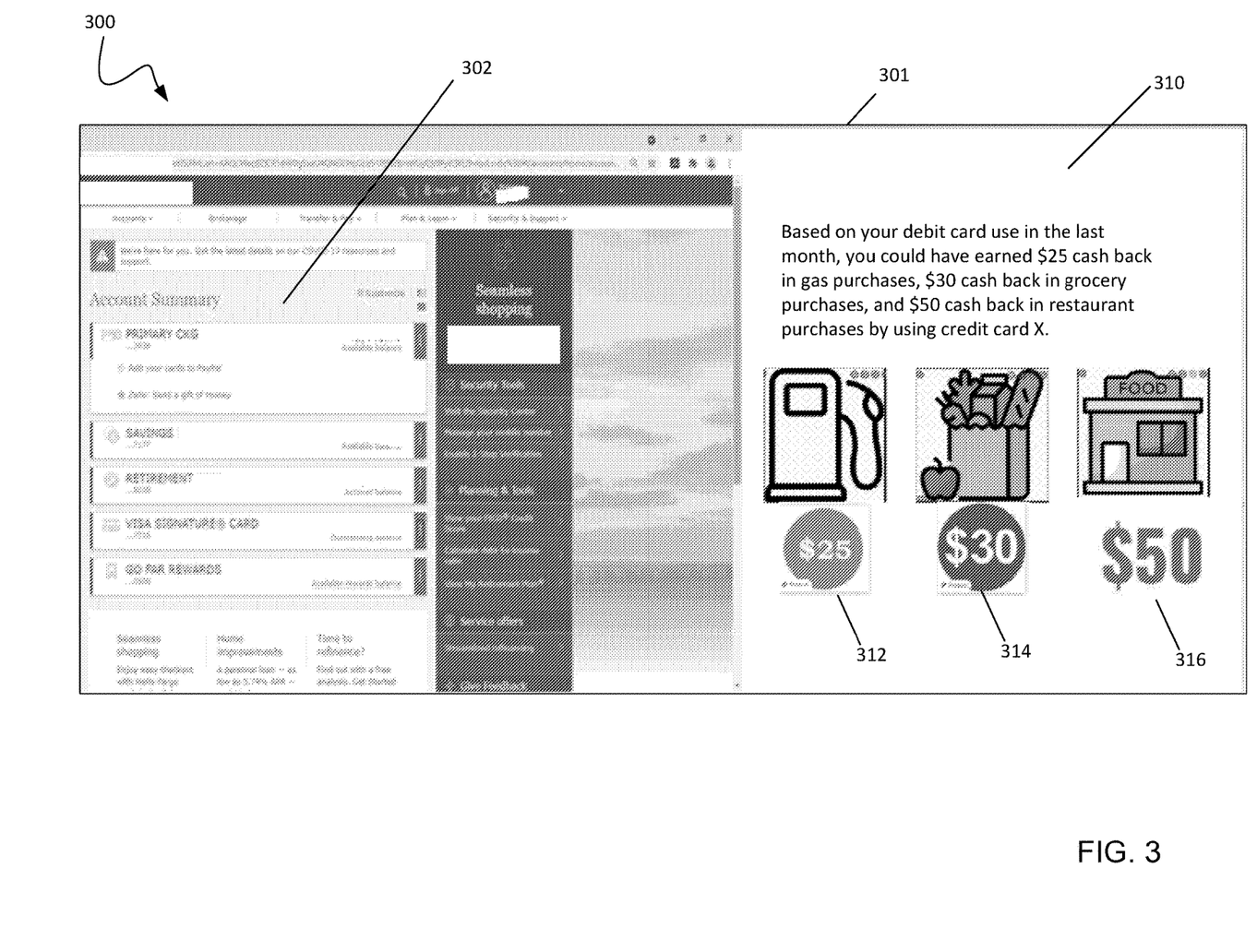
FIG. 3 shows an example graphical user interface generated by the computing device of FIG. 2.

Referring now to FIG. 3, an example graphical user interface 300 is shown. The interface 300 includes a financial information window 301 including an account summary section 302 and an incentives section 310.

In one example, the interface 300 is presented to the user when the user requests account information, such as by accessing the user's account on a financial institution web site and/or mobile wallet.

The account summary section 302 provides the user with a summary of the user's accounts, such as a checking account, savings account, and other associated accounts like credit card account, retirement account, and reward account. The user can access details associated with each account (e.g., transactions) by selecting the relevant account from the account summary section 302.

The incentives section 310 presents the potential incentives for the user associated with the use of a credit card rather than a debit card. The examples provided herein relate to money saved through cashback, but there are many other types of incentives as noted herein, such as points, travel miles, etc.

For instance, the incentives section 310 identifies specific categories of spending (gas category 312, grocery category 314, and restaurant category 316) and the associated possible savings (e.g., cashback incentive and/or points) for each if a credit card was used rather than a debit card. The actual estimated savings for each is also provided, such as a possible $25 savings for gas purchases. The estimated savings can be based upon a specific credit card product or just be an estimate based upon typical savings.

In some examples, each category is selectable to allow the user to access details about the transactions associated with that category. For instance, when the interface 300 receives a selection of the gas category 312, a list of all of the debit card transactions associated with that category can be provided (e.g., date of transaction, merchant, cost, etc.).

Further, in some examples, the user can also be provided with information about the specific credit card products so that the user apply for the credit card, if desired. For instance, the interface 300 can provide a link to more information about the credit card product and how to apply. In some examples, the dashboard module 206 is programmed to offer credit card products for which the user is prequalified based upon the analysis by the credit card offer module 205, so the user can obtain the credit card with little additional information or time.

Figure 4:
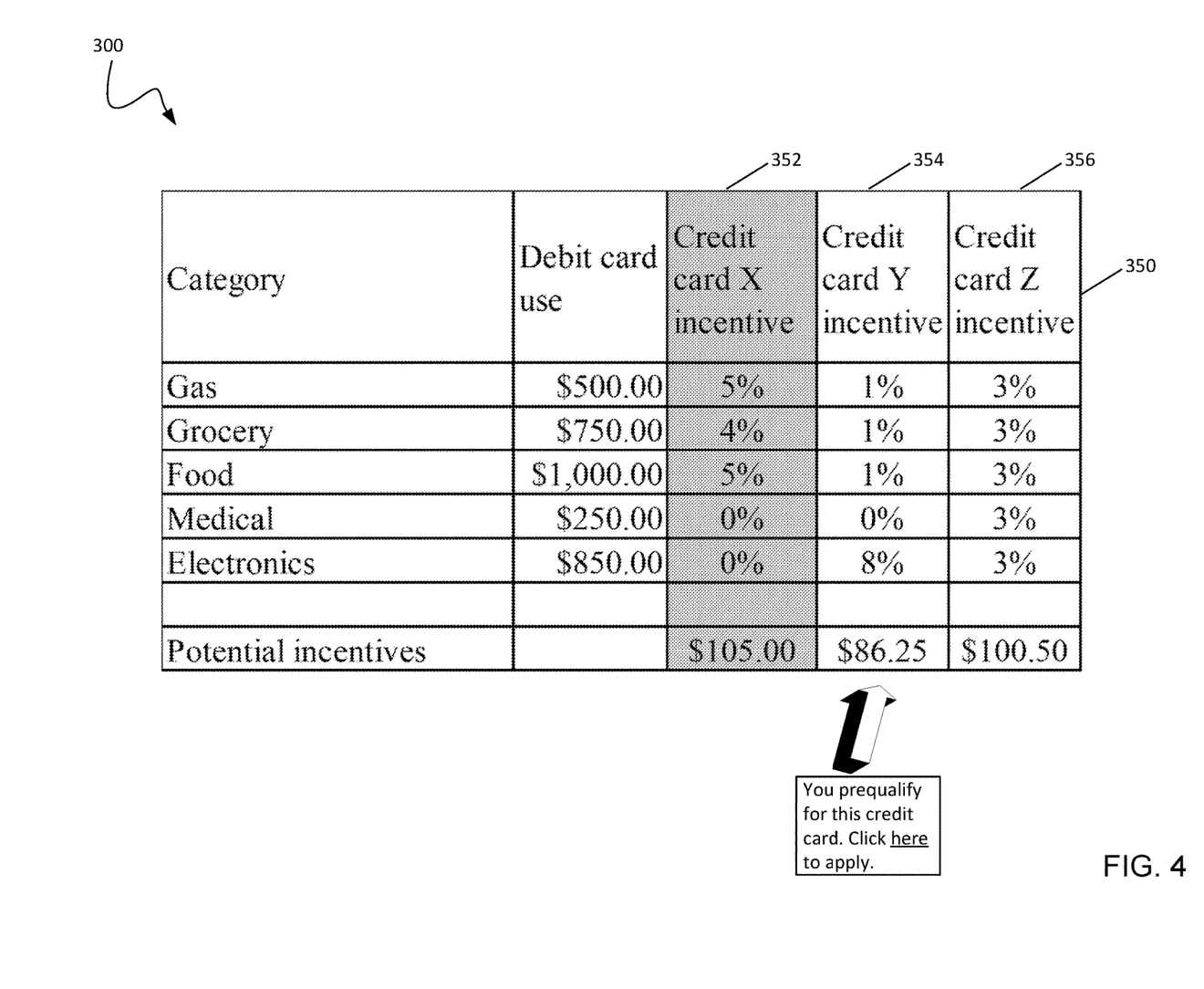
FIG. 4 shows another example graphical user interface generated by the computing device of FIG. 2.

For example, referring now to FIG. 4, the graphical user interface 300 can provide a graphical representation of different credit card products and the potential savings for using each, as noted above.

In this example, the interface 300 provides a table 350 that lists the debit card use in the relevant categories and then shows the incentives (in this instance, cashback percentages) for each of three credit card products 352, 354, 356. The table 350 can be presented to the user upon the receipt of the user's selection of the incentives section 310. Or, the table 350 can be presented in conjunction with or as an overlay to the financial information window 301. Many configurations are possible.

The credit card offer module 205 is programmed to highlight the credit card that provides the greatest potential savings among the different products listed. In the example, this is credit card product 352, which is highlighted on the table 350.

Further, the interface 300 indicates that the user is prequalified for the credit card product 354. The interface 300 can provide a link to the user directly to the application for the credit card product 354 upon selection by the user. This streamlines the process by which the user can obtain the credit card product 354, if desired.

Figure 5:
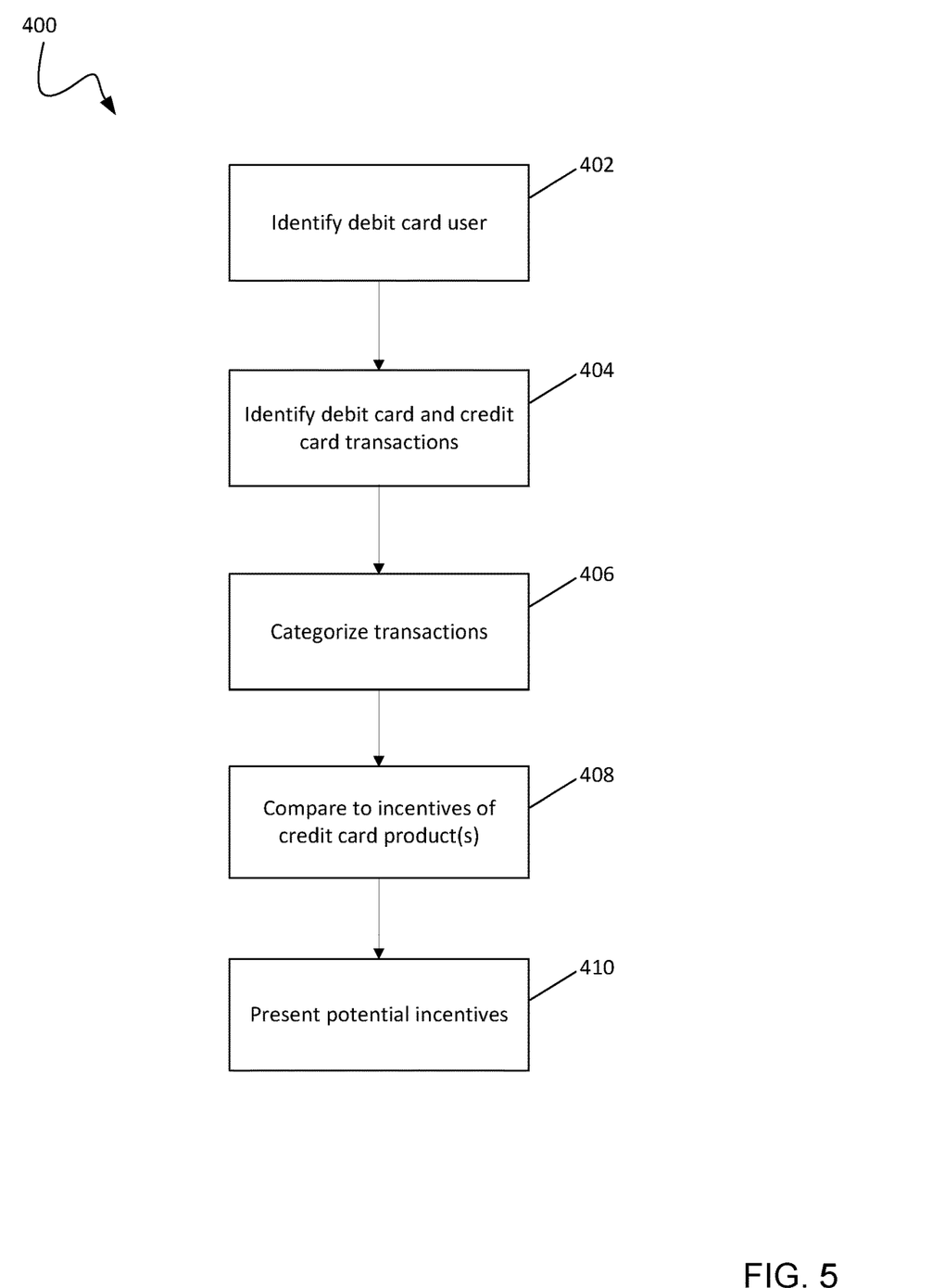
FIG. 5 shows an example method implemented by the computing device of FIG. 2.

Referring now to FIG. 5, an example method 400 for analyzing debit card as compared to credit card use is shown. This method 400 generally implements the functionality associated with the financial institution server computing device 106 described above.

At step 402, a debit card user is identified. As noted, this can be done by analyzing accounts and identifying those that have debit card use above a threshold number and/or amount. For instance, the financial institution server computing device 106 can be programmed to analyze checking accounts on a periodic basis and identify those accounts with a threshold number or amount of debit card transactions. Or, the user can request the analysis. In such an embodiment, the user may be presented with an offer on an interface to analyze the user's debit card use and possibly provide incentives.

Next, at step 404, the debit card and credit card transactions are identified. This can be done for a certain timeframe, such as the last week, last month, last 2 months, last 6 months, and/or last year. For instance, the financial institution server computing device 106 can be programmed to analyze the user's checking account and identify the number and amount of debit card transaction for a particular month. The information can include each transaction amount and MCC code associated therewith. If available, the user's credit card use can also be analyzed to determine relevant trends, such as possible non-use or use that is not optimal (e.g., purchases with less incentives than other types of transactions).

Next, at step 406, the transactions are categorized. As noted, this can be done based upon the merchant, such as by using the MCC code associated with each debit card transactions (e.g., gas, grocery, restaurant, etc.). The debit card transactions are grouped into categories so that the categories can be meaningfully compared to incentives provided by one or more credit card products. Other groupings can also be used, such as by performing an analysis of the vendors for each transaction and determining possible incentives provided by each of the vendors.

At step 408, the categories are compared to one or more credit card products to identify possible incentives for the user. For instance, the categories of debit card use can be compared to cashback incentives of credit card products to identify those credit cards that may save the user money. In some instances, multiple products are analyzed and presented to the user, possibly ordered according to incentives. In yet other examples, existing credit cards of the user can also be used for optimization, such as underutilizing such credit cards.

Finally, at step 410, the potential incentives are presented to the user, such as in an interface or through a message sent to the user. As provide above, the presentation can list one or more credit card products, possibly highlighting the product that provides the best incentive for the user.

Additional details about the savings and the credit card products can also be provided, such as information on how to obtain the credit card. As noted, the user can be prequalified for one or more of the credit card products, and the prequalification can be indicated to the user. This enhances the efficiency by which the user can obtain the product if desired, minimizing the amount of additional information needed.

The examples provided herein result in a more efficient system that can access, process, and display debit card transactions more quickly. This constitutes the practical application of a system programmed to access certain types of transactions, analyze those transactions, and display the analysis in a specific manner.

Figure 6:
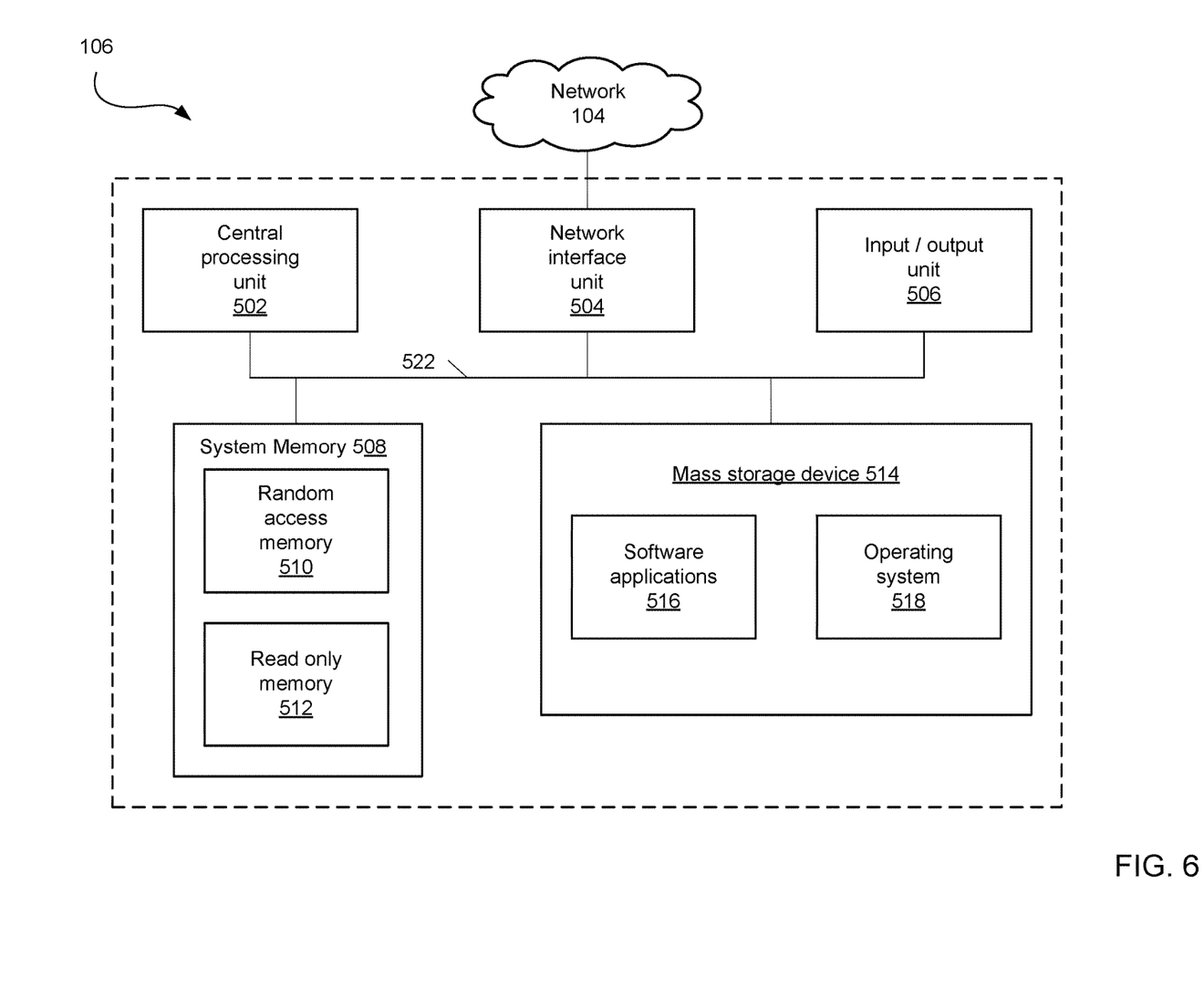
FIG. 6 shows example components of the computing device of FIG. 2.

As illustrated in FIG. 6, the example financial institution server computing device 106 includes at least one central processing unit ("CPU") 502, also referred to as a processor, a system memory 508, and a system bus 522 that couples the system memory 508 to the CPU 502. The CPU 502 can alternatively be a graphics processing unit ("GPU"). The user computing device 102 can be similarly configured.

The system memory 508 includes a random access memory ("RAM") 510 and a read-only memory ("ROM") 512. A basic input/output system that contains the basic routines that help to transfer information between elements within the financial institution server computing device 106, such as during startup, is stored in the ROM 512. The financial institution server computing device 106 further includes a mass storage device 514. The mass storage device 514 is able to store software instructions and data.

The mass storage device 514 is connected to the CPU 502 through a mass storage controller (not shown) connected to the system bus 522. The mass storage device 514 and its associated computer-readable data storage media provide non-volatile, non-transitory storage for the financial institution server computing device 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computing device 106.

According to various embodiments of the invention, the financial institution server computing device 106 may operate in a networked environment using logical connections to remote network devices through the network 104, such as a wireless network, the Internet, or another type of network. The financial institution server computing device 106 may connect to the network 520 through a network interface unit 504 connected to the system bus 522. It should be appreciated that the network interface unit 504 may also be utilized to connect to other types of networks and remote computing systems. The financial institution server computing device 106 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the financial institution server computing device 106 can store software instructions and data. The software instructions include an operating system 518 suitable for controlling the operation of the financial institution server computing device 106. The mass storage device 514 and/or the RAM 510 also store software instructions and software applications 516, that when executed by the CPU 502, cause the financial institution server computing device 106 to provide the functionality of the financial institution server computing device 106 discussed in this document. For example, the mass storage device 514 and/or the RAM 510 can store software instructions that, when executed by the CPU 502, cause financial institution server computing device 106 to display data on the display screen of the financial institution server computing device 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computing device, comprising:
a processor; and
a system memory, the system memory including instructions which, when executed by the processor, cause the computing device to:
access, via a computer network, transaction data related to a debit card use from one or more financial data aggregators, where the one or more financial data aggregators combine financial accounts for a user across different financial institutions to provide a dataset of user financial transactions;
categorize the debit card use from the dataset of user financial transactions into one or more categories of spending based upon a type of merchant;
map the one or more categories to a potential savings associated with a plurality of credit card products;
identify one or more credit card products that the user is prequalified to obtain;
present a first user interface including an account summary section and an incentives section presenting one or more potential incentives for the user associated with use of the one or more credit card products in place of the debit card use, wherein the incentives section identifies one or more categories of spending with an associated possible savings for each of the one or more categories of spending if the one or more credit card products had been used;
receive a selection, by the user, of the one or more categories of spending with the associated possible savings on the incentives section of the first user interface from a user device; and
upon receiving the selection of the one or more categories of spending on the first user interface, generate a second user interface overlayed on the first user interface to provide a modified first user interface displaying a graphical representation of the one or more credit card products and the potential savings for each, wherein the second user interface provides a link to the user to an application that allows the user to apply for a prequalified credit card product from the one or more credit card products, facilitating immediate application for the selected prequalified credit card product by enabling direct submission through the second user interface.

2. The computing device of claim 1, comprising further instructions which, when executed by the processor, cause the computing device to select a financial account based upon a comparison of the debit card use to a threshold.

3. The computing device of claim 2, wherein the financial account is a checking account.

4. The computing device of claim 2, comprising further instructions which, when executed by the processor, cause the computing device to identify debit card transactions based upon a transaction type associated with each financial transaction.

5. The computing device of claim 1, comprising further instructions which, when executed by the processor, cause the computing device to identify the one or more categories based upon a Merchant Category Code associated with each debit card transaction.

6. The computing device of claim 1, comprising further instructions which, when executed by the processor, cause the computing device to compare each of the one or more categories to each incentive associated with the plurality of credit card products.

7. The computing device of claim 1, comprising further instructions which, when executed by the processor, cause the computing device to display an amount of the potential savings.

8. The computing device of claim 1, comprising further instructions which, when executed by the processor, cause the computing device to receive a selection of a first category of the one or more categories.

9. The computing device of claim 8, comprising further instructions which, when executed by the processor, cause the computing device to list a subset of debit card transactions associated with the first category.

10. The computing device of claim 1, comprising further instructions which, when executed by the processor, cause the computing device to present other benefits associated with use of the plurality of credit card products including one or more of building a positive credit history, providing loss protection, and providing extended warranties.

11. A method, comprising:
accessing, by a processor via a computer network, transaction data related to debit card use from one or more financial data aggregators, where the one or more financial data aggregators combine financial accounts for a user across different financial institutions to provide a dataset of user financial transactions;
categorizing, by the processor, the debit card use from the dataset of user financial transactions into one or more categories of spending based upon a type of merchant;
mapping, by the processor, the one or more categories to potential savings associated with a plurality of credit card products;
identifying, by the processor, one or more credit card products that the user is prequalified to obtain;
presenting, by the processor programmed to execute a dashboard module, a first user interface including an account summary section and an incentives section presenting one or more potential incentives for the user associated with use of the one or more credit card products in place of the debit card use, wherein the incentives section identifies one or more categories of spending with an associated possible savings for each of the one or more categories of spending if the one or more credit card products had been used;
receive, by the processor, a selection, by the user, of the one or more categories of spending with the associated possible savings on the incentives section of the first user interface from a user device; and
upon receiving the selection of the one or more categories of spending on the first user interface, generate, by the processor programmed to execute a dashboard module, a second user interface overlayed on the first user interface to provide a modified first user interface displaying a graphical representation of the one or more credit card products and the potential savings for each, wherein the second user interface provides a link to the user to an application that allows the user to apply for a prequalified credit card product from the one or more credit card products, facilitating immediate application for the prequalified credit card product by enabling direct submission through the second user interface.

12. The method of claim 11, further comprising selecting a financial account based upon a comparison of the debit card use to a threshold.

13. The method of claim 12, wherein the financial account is a checking account.

14. The method of claim 12, further comprising identifying debit card transactions based upon a transaction type associated with each financial transaction.

15. The method of claim 11, further comprising identifying the one or more categories based upon a Merchant Category Code associated with each debit card transaction.

16. The method of claim 11, further comprising comparing each of the one or more categories to each incentive associated with the plurality of credit card products.

17. The method of claim 11, further comprising displaying an amount of the potential savings.

18. The method of claim 11, further comprising receiving a selection of a first category of the one or more categories.

19. The method of claim 18, further comprising listing a subset of debit card transactions associated with the first category.

20. The method of claim 11, further comprising presenting other benefits associated with use of the plurality of credit card products including one or more of building a positive credit history, providing loss protection, and providing extended warranties.

* * * * *

UNITED STATES PATENT AND TRADEMARK OFFICE
CERTIFICATE OF CORRECTION

PATENT NO. : 12,282,934 B1
APPLICATION NO. : 18/170369
DATED : April 22, 2025
INVENTOR(S) : Venkatesh Hebbar Page 1 of 1

It is certified that error appears in the above-identified patent and that said Letters Patent is hereby corrected as shown below:

In the Claims

Column 11, Line 61, Claim 1: after "the" delete "selected".

Signed and Sealed this
Twenty-fourth Day of June, 2025

Coke Morgan Stewart
*Acting Director of the United States Patent and Trademark Office*